United States Patent [19]

Gelardi et al.

[11] 4,306,663

[45] Dec. 22, 1981

[54] CASSETTE SHELL MODIFICATION AND METHOD OF ASSEMBLY AND USE

[76] Inventors: Anthony L. Gelardi; John A. Gelardi, both of P.O. Box 127, Cape Porpoise, Me. 04014; Robert B. MacLeod, Jr., Whitten Hill Rd., R.F.D. #1, Biddeford, Me. 04005

[21] Appl. No.: 173,716

[22] Filed: Jul. 30, 1980

[51] Int. Cl.$^3$ .................. G11B 23/08; G11B 23/10; G03B 1/04
[52] U.S. Cl. .................. 220/4 B; 206/389; 242/75.4; 242/199; 29/463; 294/64 R
[58] Field of Search .............. 206/389; 220/4 B, 4 E; 242/199, 75.4; 29/463, 434, 526 R; 294/64 R

[56] References Cited

U.S. PATENT DOCUMENTS

| | | | |
|---|---|---|---|
| 2,086,134 | 7/1937 | Ludwick | 29/463 |
| 3,515,424 | 6/1970 | Jodin | 294/64 R |
| 3,556,433 | 1/1971 | Abitboul | 242/199 |
| 3,556,434 | 1/1971 | Koeppe | 242/199 |
| 3,565,367 | 2/1971 | Yamamoto | 242/199 |
| 3,608,946 | 9/1971 | Erickson | 294/64 R |
| 3,712,559 | 1/1973 | Schwartz | 242/199 |
| 3,804,351 | 4/1974 | Kaneko et al. | 242/199 |
| 3,857,532 | 12/1974 | Bastiaans | 242/199 |
| 3,942,744 | 3/1976 | Fitterer et al. | 242/75.4 |

Primary Examiner—William T. Dixson, Jr.

[57] ABSTRACT

A cassette shell modification and method of assembly and use thereof comprises providing apertures in each cassette half shell adjacent support structure for tape spool hubs as normally provided within a completed cassette. These apertures, added to what is basically a conventional cassette assembly, provide for better and easier assembly of the overall cassette, and also the loading thereof with desired tape material after completion of assembly. By applying vacuum to a washer mounted internally of a cassette half shell during initial assembly of the overall cassette, the washer can be secured against the inner side of the shell. This is especially desirable if and when the washer is of textured configuration, either convexly or concavely curved, of varying thickness and weights, or is a creased or otherwise damaged normally smooth and flat washer. Thus, the overall assembly of the cassette can be effected quicker and easier. Then again after the cassette is completely assembled and ready for loading of magnetic tape onto the tape spool hubs mounted in the cassette and between the associated washer structure, air under pressure can be applied to either one or both sides of the cassette, and thus exert pressure of the washers against the tape spool hubs and the tape material being wound thereupon. This applies with the cassette being loaded in both the horizontal and vertical position. In the horizontal position, air under pressure need only be applied to the upper side of the cassette, while in the vertical position, air is preferably applied to both sides thereof.

11 Claims, 5 Drawing Figures

CASSETTE SHELL MODIFICATION AND METHOD OF ASSEMBLY AND USE

BACKGROUND OF THE INVENTION

1. Field of the Invention

This invention relates generally to tape cassettes and the method of assembly and use thereof during the manufacturing operation of a completed, loaded with tape, tape cassette.

2. Description of the Prior Art

A common problem with known type cassette half shells is that they are not designed to make the process and method of assembly into a completed tape cassette as simple and complete as possible.

Another common problem of known cassette tape devices is that they do not provide structure for using the washers as commonly provided on both sides of the loaded tape contained within a completed cassette for ease of assembly of the cassette half shells, nor aid during loading of the completed cassette device with the desired tape material to form a completed, loaded blank tape cassette.

Existing prior patents which may be pertinent to this invention are as follows:

| INVENTOR | PATENT NUMBER | DATE GRANTED |
| --- | --- | --- |
| Sasaki et al. | 3,529,788 | Sept. 22, 1970 |
| Abitboul | 3,556,433 | Jan. 19, 1971 |
| Ito et al. | 3,612,422 | Oct. 12, 1971 |
| Inaga | 3,735,939 | May 29, 1973 |

The patent to Sasaki et al. (U.S. Pat. No. 3,529,788) discloses projections 39 in the cartridge case for the purpose of holding a gasket 10 in place. See FIG. 5.

The Abitboul patent (U.S. Pat. No. 3,556,433) discloses a tape cassette wherein the tension of the tape is controlled by the pressure of a thin sheet gasket-like material bowed toward the tape spool.

The Ito et al. patent (U.S. Pat. No. 3,612,422) discloses hole 11 in the gasket with projections 16 in the outer case for the purpose of holding the gasket in proper place.

The Inaga patent (U.S. Pat. No. 3,735,939) discloses apertures 18 and 19 in a cartridge case for the purpose of aligning the cartridge in a recorder structure. Also element 17 is provided to prevent accidental erasure of the recorded material on the tape.

None of these prior art patents offer the new and novel features of subject invention.

SUMMARY OF THE INVENTION

An object of the present invention is to provide a modified cassette half shell which is more readily and quickly assembled during the process of putting two half shells together into a complete cassette, and then is further better usable for loading of the cassette device with the desired amount of tape material to form a completed, loaded blank tape cassette.

Another object of this invention is to provide a cassette half shell having spaced apertures therein which permit the use of vacuum during the initial assembly of two half shells into a completed tape cassette form, and then permit the use of air under pressure during the loading of the tape spool hubs of the cassette device with the desired tape material.

A further object of this invention is to provide a method of assembly for use during the manufacturing process of tape cassettes which will be faster and more economical than known prior art assembly methods.

A still further object of this invention is to provide a cassette device having washers therein for engagement and abutment with tape material on tape spool hubs which can utilize vacuum and/or pressure on the washers during initial assembly and loading of the cassette device.

The cassette shell modification of the present invention consists of the providing of one or more holes in each cassette half shell, and with these holes in proper alignment with an internal washer and tape material. The provision of these properly spaced holes will allow two very desirable functions to take place. First, vacuum or suction can be applied through the holes to the respective washer in each half shell thereby holding same against the inner casing or the half shell during assembly thereof into a completed cassette device. This works extremely well regardless of the washer thickness, curvature (either concave or convex), or texture thereof. Thus, this simple feature eliminates the need to secure the washer and half shell mechanically together, and also eliminates the use of alcohol or other liquids.

Another important feature of subject invention is the provision for the use of air under pressure through the holes provided in the modified cassette when it is in the C-O format. In this format, the cassette is fully assembled with a leader attached to each of the tape hubs. In this format, the cassette shell is ready for loading of the desired tape material into the cassette. During this loading process, air pressure can be introduced through the holes provided in the modified half shells of the cassette device. This air pressure can be introduced through the holes on either one or both sides of the cassette device. When such air is introduced, the pressure will be against the outer sides of the associated washer which will in turn force same against the tape spool hub and the tape being wound thereon. With the tape cassette device being loaded while in a horizontal position, air would only be needed to be introduced on the upper side of the cassette, i.e., on the upper side of the upper washer, while if the cassette is being loaded in a vertical position, air under pressure would be introduced on both sides of the cassette device. In such vertical loading, the air pressure would cause both washers to press against the tape spool hubs and the tape material while being wound thereupon.

After the cassette device is completely loaded with the desired tape material, and the completed blank cassette is almost ready for distribution and selling, the cassette is of course removed from the tape winder and labelled. This labelling process seals the holes as provided initially, and prevents the entrance of dirt and other foreign matter into the cassette device. So, after final completion and loading with blank tape, the finished cassette device can be packaged for selling.

It should be noted that in the state of the art cassettes, smooth and flat washers are normally used which are capable of being held during assembly to the respective cassette half shells by static electricity charge as created by the plastic material itself. Or sometimes other mechanical devices are used to hold each washer and half shell together during assembly, or alcohol or other liquids are sometimes used. The modified cassette structure of the present invention with the apertures provided therein for receiving vacuum or suction therethrough to hold the washers against the cassette half shells during initial cassette assembly is especially useful when the washers are creased, curved in either a convex or concave manner, of varying thickness and weights, or of textured material. With any of these type washers the state of the art type method of assembly is inadequate. This invention solves the problem created by the use of washers of varying types other than smooth and flat. Of course, it is also useful with smooth and flat washers and especially so if they are creased, warped, or otherwise less than perfect, but is of much more usefulness with the other type of washers.

These together with other objects and advantages which will become subsequently apparently reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
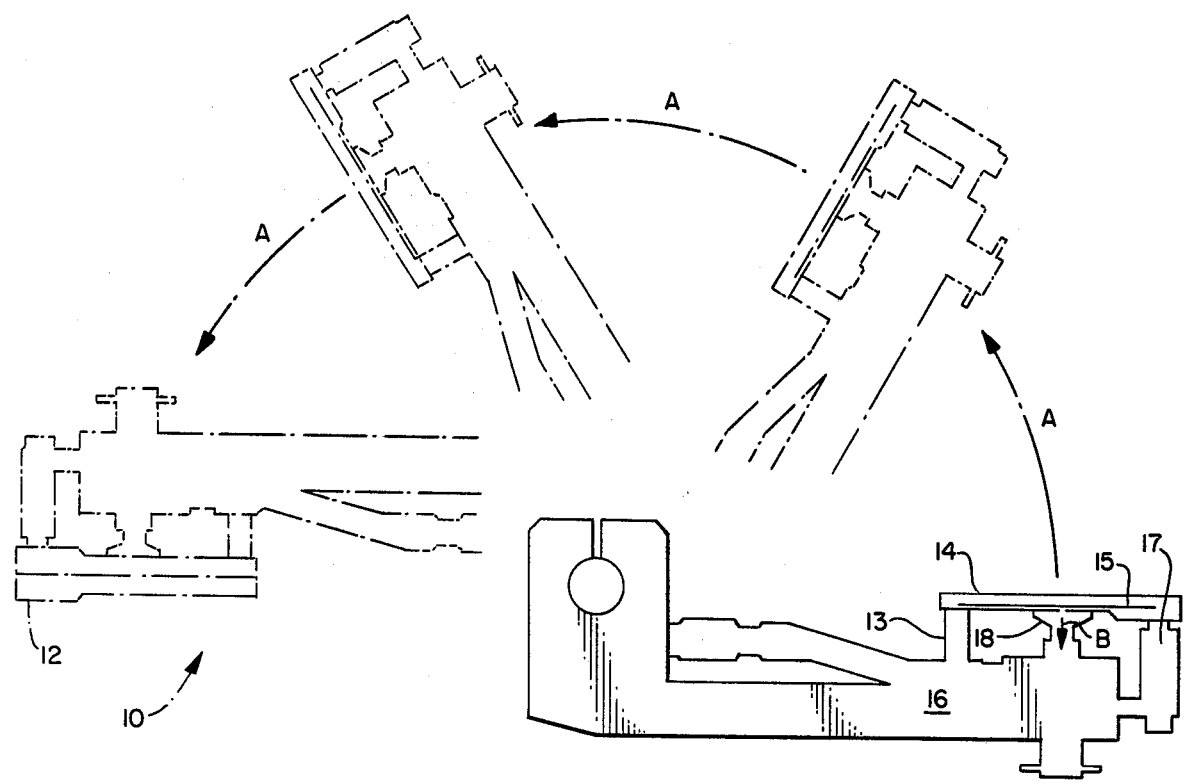
FIG. 1 is a sketch showing the method of using the modified cassette half shell of this invention during the manufacturing and assembly of a complete cassette device.

Referring to FIG. 1 of the drawings, reference numeral 10 indicates in general the assembly of the cassette device of this invention during the manufacture thereof. In the process of assembly, as depicted in FIG. 1, the two half shells of a tape cassette are shown. A first half 12 containing a washer and two tape spool hubs is supported on a supply and assembly belt, not shown, while the second half 14 is supported by an assembly arm 16 mounted for appropriate movement as indicated by the flow arrows A. Mechanical structure 13 and 17 on the outer end of the pivotally mounted arm 16 support the half shell 14 in a desired manner while a vacuum cup structure 18 suitably mates with an aperture 20 provided in the cassette shell 14. A suitable vacuum or suction is indicated by flow arrow B and this will hold the washer 15, after placement thereof in the cassette half shell 14, securely against the inner side of the cassette shell itself. Then the arm 16 is used to transfer the cassette half shell with the washer held tightly against the inner side thereof, over to mate with the other cassette half shell 12. As shown in dotted lines in the leftmost portion of FIG. 1, this assembly step has been completed. At an appropriate time, the vacuum is released, and then the two properly mated half shells are moved along by the transfer belt to a welding station. At the welding station, the two halves of the plastic cassette are welded, or otherwise permanently secured together.

While this method of assembly can be used with cassettes having washers of the general state of the art type, that is smooth and flat washers, since these washers are capable of normally being held by a mere static charge created by the plastic material itself, the maximum benefit of subject invention is not achieved when such washers are used. However, when washers other than the conventional type are used, this invention is extremely important and useful. For example, when such washers are curved, i.e., in either a convex or concave format, the vacuum process of the foregoing method is extremely useful for holding them in place during assembly of the cassette device. Also, when the washers are of varying thickness and weights throughout each individual washer, or the washers are textured, for example, corregated, ribbed, or otherwise contoured with an irregular surface. Also, even with smooth and flat washers, if these washers are creased or somewhat damaged so that irregularities appear on the surface thereof, the vacuum process of this invention is extremely useful.

Thus, as can be easily visualized, by merely providing the simple addition of apertures 20 to a normal type tape cassette, the important benefits of subject invention are achieved. This is very simple, but extremely advantageous.

Figure 2:
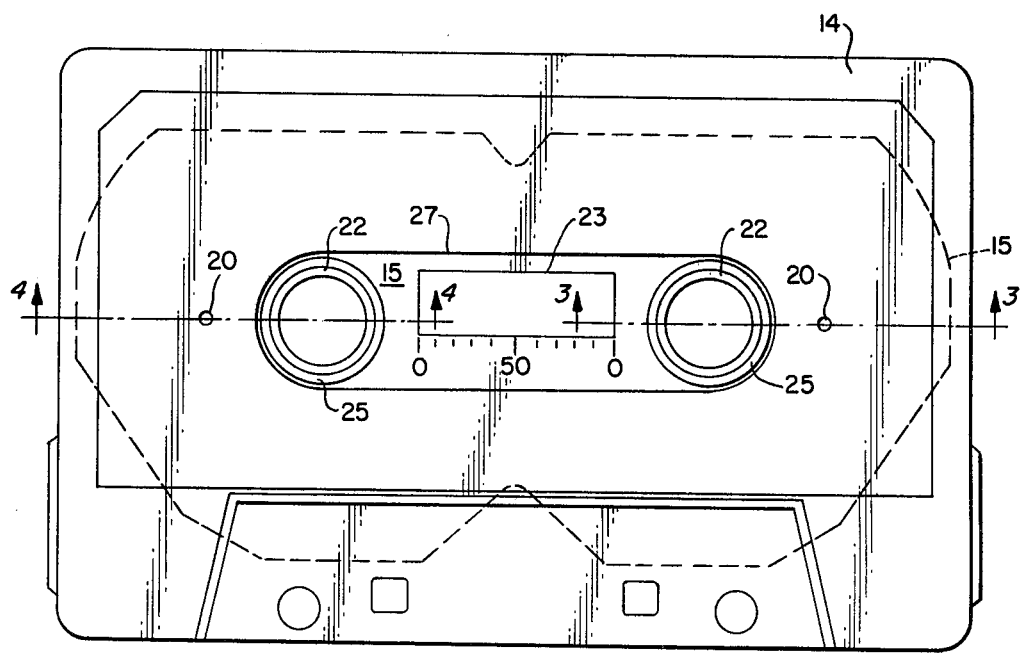
FIG. 2 is a top plan view of the cassette device as modified by this invention.

Looking at FIGS. 2-4, other important features of subject invention will now be described. FIG. 2 shows a top plan view of the cassette as modified by this invention. The apertures 20 are provided on either side of the tape material hubs 22 and approximately centered lengthwise along the center line of the tape spool hubs of the cassette. The outer circumference of washer 15 is indicated in dotted lines, while the center portion with a window 23 may be seen through window 27. Tape measuring indicia may also be provided as shown in FIG. 2. Thus, whether vacuum or pressure air is used with the cassette apertures 20, the vacuum or pressure will be balances as applied against the washer 15. Also, projections 25 are provided to support the tape spool hubs 22, and to center washer 15 through holes 35 provided therein (see FIGS. 3-5).

Figure 3:
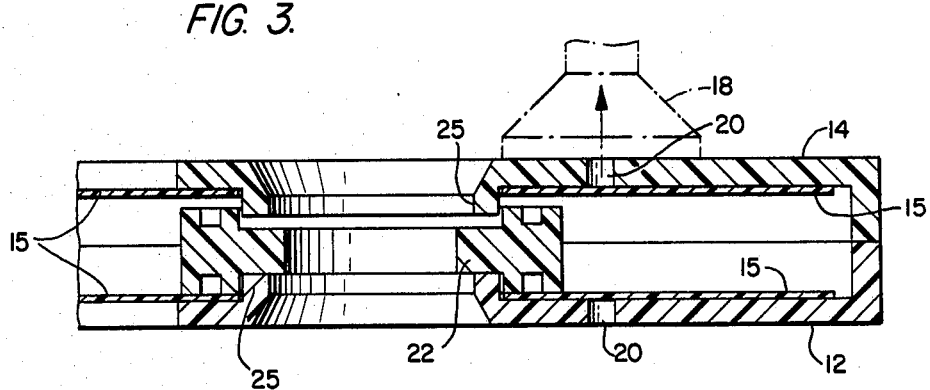
FIG. 3 is a view, partly in cross-section, taken generally along the lines 3—3 of FIG. 2 depicting the use of vacuum.

FIG. 3 shows the use of vacuum cup structure 18 for one half of the cassette such as takes place during the process depicted in FIG. 1. As can be seen in this cross-sectional elevational view, the upper washer 15 is securely held against the inner side of the cassette half shell 14 which permits this cassette shell 14 to be assembled to the other cassette half shell 12 in the manner already described. While only one suction structure 18 is shown in this view, obviously on the structure arm 16 of FIG. 1, a similar suction structure 18 is provided for the other aperture 20 of the cassette shell 14 for the other half of the washer 15.

Figure 4:
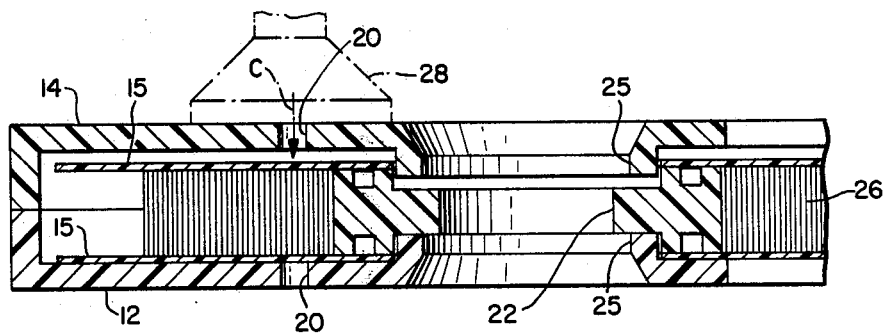
FIG. 4 is an elevational view, partly in cross-section, taken generally along the lines 4—4 of FIG. 2 depicting the use of air under pressure.
Figure 5:
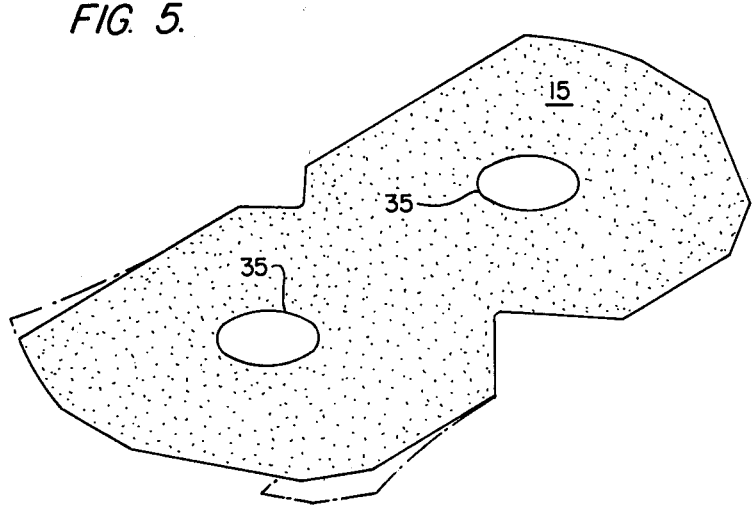
FIG. 5 is a perspective view of a washer per se as used with subject invention.

FIG. 4 shows a pressure air structure 28 which is basically quite similar to the vacuum or suction structure 18. This structure 28 is used to apply air under pressure through the apertures 20 of the modified cassette shell halves. As shown in FIG. 4, air pressure C is being applied to the half of washer 15 shown to put pressure on the tape spool hub 22, and also the tape material 26 being wound thereupon. Of course, this view of FIG. 4 is when the overall cassette device is being loaded with tape in the horizontal position in a tape loading machine. In this position, as shown, the lower washer 15 is compressed by the pressure exerted by the lower side of the tape material 26 and the lower side of the hub 22 against the washer which in turn presses against the upper inner side of the lower half 12 of the cassette. Thus, in the horizontal loading position, air pressure need only to be applied to the apertures 20 of the cassette upper half, and not at all to the lower half.

However, if the assembled cassette is being loaded in the vertical position, not shown as such, but which can be easily visualized by turning FIG. 4 so as to be viewed with the cassette aligned vertically, air pressure then should be simultaneously applied to both sides of the cassette, i.e., to both the halves 12 and 14 by duplicate air pressure structures 28 exerting air under pressure through the apertures 20.

The purpose of using air pressure during the loading of tape in the assembled cassette is to force the washers 15 towards each other so that the magnetic tape being wound between them is wound more uniformly upon the respective tape spool hubs. This has been discovered to be a very desirable advantage of subject invention.

After completing the loading of the cassette with the desired tape material, either in the horizontal or the vertical manner, the duplicate or more pressure structures 28 are appropriately removed from the cassette. Then, the cassette is removed from the tape loading winder machine structure, and then has appropriate labels applied on both sides thereof. This labelling process secures and seals the apertures 20, and thus prevents the contamination of the tape material inside the cassette from dust, dirt and other foreign matter.

The method and structure of the modified cassette of the present invention, and the manner of assembly and loading thereof present a number of new and novel features not known prior to this invention. While the provision of apertures 20 in what is basically a well known cassette assembly seems extremely simple and unimportant, it has been discovered to offer many very worthwhile and extremely desirable benefits.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

We claim:

1. A process of assembly of cassette half shells into a completed cassette for magnetic tape comprising:
   the step of providing a first cassette half shell in a desired position at an assembly station together with necessary internal components therewith,
   providing a second cassette half shell at a position adjacent said assembly station,
   placing a tape contacting washer in the second cassette half shell,
   applying a vacuum to the outside of the second cassette half shell and to the side of the washer against the inner side of the cassette half shell by suitable provision of at least one aperture in the cassette half shell,
   maintaining said vacuum while moving the second cassette half shell over onto said first cassette half shell for assembly of the two half shells theretogether.

2. The process of claim 1, wherein the assembled cassette half shells are then transported to a welding station for securement of the two cassette half shells permanently together, or they are secured in a less permanent fashion with screws.

3. A cassette half shell comprising:
   a rectangular housing having a flexible washer member contained therein, and a pair of tape material hubs rotatably mounted adjacent same, and
   means provided in the housing near at least one of the tape materal hubs for permitting the use of a gas medium with the washer member during initial assembly of the shell into a completed cassette and then further use in the loading of the cassette with tape.

4. A cassette half shell as set forth in claim 3, wherein two of said halves are provided with each having the aforesaid means provided therewith, and said cassette halves are permanently sealed together for final completion of an overall tape cassette device.

5. A tape cassette device comprising:
   a first cassette half shell of conventional rectangular size and structure and including a pair of inwardly projecting tape spool hub mounting projections, a flexible washer appropriately supported and centered by said pair of projections, a complementary cassette half shell of similar structure to the aforesaid also provided with a flexible washer, said cassette halves being securely fastened together by welding or by screws for winding of tape material on said tape spool hubs for completing the overall cassette blank tape assembly, and means provided in each half shell for permitting the use of a gaseous medium with each washer during assembly and also loading of the cassette assembly device.

6. A structure as defined in claim 5, wherein at least one of said washers is selected from the group consisting of a textured washer, a ribbed washer, a washer of varying thickness and material, a convex washer, a concave washer, or a creased washer.

7. A structure as defined in claim 5, wherein said means includes at least one extra aperture in each half shell.

8. A method of loading magnetic tape into a cassette device comprising: applying air under pressure through an appropriate aperture in the cassette for the purpose of pushing a washer therewithin against a tape spool hub and the magnetic tape while being wound thereupon, and maintaining said air pressure while said tape spool hubs are being wound with tape until the tape loading of the cassette device is completed.

9. The process of claim 8, wherein said cassette device is loaded in a horizontal position, and thus the air pressure is applied to only an upper washer while gravity functions to apply pressure between the tape material and tape spool hub and a lower washer and lower cassette half.

10. The process as in claim 8, wherein said cassette device is loaded in a vertical position, and air under pressure is applied to both sides of the overall cassette through apertures in each cassette half, and thus air is applied to each of two washers on either side of the tape spool hub and the tape material while being wound thereupon.

11. The process of claim 9 or 10, wherein after completion of the loading of magnetic tape onto the tape spool hubs within the cassette, the air pressure being applied is stopped and the cassette is then removed from the winder apparatus, and thereafter the apertures as provided within the cassette shell halves, are appropriately sealed by covering labels in preparation for final distribution of the loaded with blank tape cassette.

* * * * *